United States Patent [19]

Katahira

[11] Patent Number: 4,584,611

[45] Date of Patent: Apr. 22, 1986

[54] METHOD AND APPARATUS FOR DRIVING A CCD IMAGE SENSOR

[75] Inventor: Shunsuke Katahira, Hino, Japan

[73] Assignee: Tokyo Shibaura Denki Kabushiki Kaisha, Kanagawa, Japan

[21] Appl. No.: 519,715

[22] Filed: Aug. 2, 1983

[30] Foreign Application Priority Data

Aug. 18, 1982 [JP] Japan .................................. 57-142028

[51] Int. Cl.$^4$ .............................................. H04M 1/10
[52] U.S. Cl. .................................... 358/293; 358/294; 250/578
[58] Field of Search ............... 358/293, 294, 288, 212, 358/213; 250/578

[56] References Cited

U.S. PATENT DOCUMENTS 4,160,279 7/1979 Fuwa ................................... 358/288

Primary Examiner—Edward L. Coles, Sr.
Attorney, Agent, or Firm—Banner, Birch, McKie & Beckett

[57] ABSTRACT

A method and apparatus for driving a CCD image sensor is provided in which the time period of subscan can be a continuous value responsive to the amount of image information received by the CCD image sensor. The control time periods of the CCD image sensor are separated into first control time periods which are fixed in duration and second control time periods which are variable. The first and second control time periods alternate. Image information signals are obtained by exposure of the CCD image sensor during the first control time periods and are outputted during the second control time periods. These second control time periods vary in accordance with the amount of image information received by the CCD image sensor during the first control time periods.

6 Claims, 5 Drawing Figures

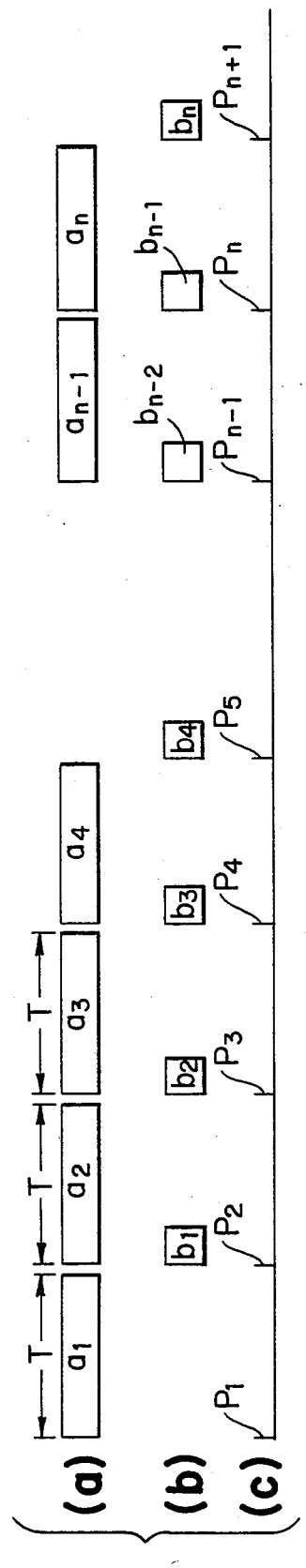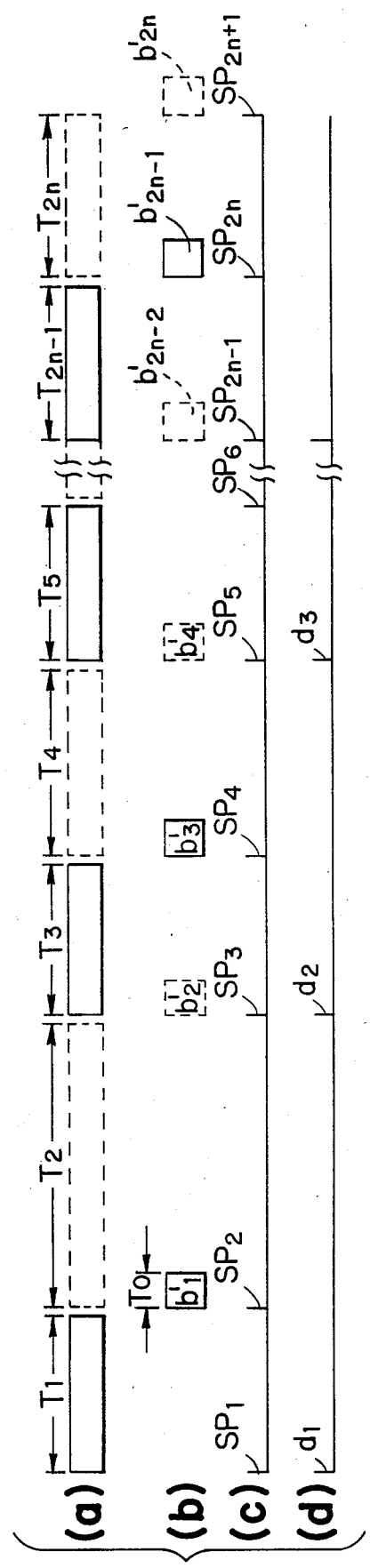
FIG. 1. (PRIOR ART)
FIG. 2.

METHOD AND APPARATUS FOR DRIVING A CCD IMAGE SENSOR

BACKGROUND OF THE INVENTION

This invention relates to a method and apparatus for driving CCD image sensor in facsimile type equipment in which the signal sensed by the CCD image sensor is coded by using a redundancy suppressed coding technique.

In facsimile equipment using the above mentioned coding technique because the amount of coded information varies for each main scan, intermittent and variable speed subscanning systems have been adopted. In these subscanning systems, the subscan stops when the information stored exceeds a certain amount. The subscan then resumes when the information stored is less than a certain amount. However, in these subscanning systems, high speed operation is difficult because of the time it takes to completely stop subscanning. In addition, during the stopping or starting of the subscan, disorders sometimes occur in the reproduced picture due to vibration of the mechanical system.

Other variable speed subscanning systems have been adopted to resolve the above mentioned problems. In such systems, a predetermined number N of subscan speeds are available for selection. By selecting the proper combination of subscan speeds from the predetermined number N of subscan speeds, each main scan can be made to correspond to the amount of coded information.

Although the disadvantages of stopping and starting the subscan are avoided in the latter systems, other disadvantages occur as explained more fully below.

The exposure time period of a CCD image sensor is fixed at T seconds as shown in FIG. 1. When the first shift pulse $P_1$ (in conventional CCD image sensors, shift pulses supplied to the CCD image sensor cause information stored in the image sensor to be shifted out so that new information can be stored in response to the next exposure) is supplied to the CCD image sensor, exposure $a_1$ for particular main scan begins. When shift pulse $P_2$ occurs, exposure $a_1$ is finished and exposure $a_2$ for the next main scan begins. Upon the occurrence of shift pulses $P_3$, $P_4$, $P_5$, ..., similar exposures $a_3$, $a_4$, $a_5$, ..., take place. Information stored in the CCD image sensor during exposure $a_1$ is outputted in response to shift pulse $P_2$. The transfer output time of the information stored during exposure $a_1$ is represented by signal $b_1$. Similarly, information stored during exposure $a_2$ is outputted during the time represented by signal $b_2$ in response to shift pulse $P_3$. At the times of shift pulses $P_4$, $P_5$, $P_6$, ..., information stored during exposures $a_4$, $a_5$, $a_6$, ..., is outputted during transfer output times $b_4$, $b_5$, $b_6$, ...

As mentioned previously, in the above conventional system, the exposure time period is fixed at T seconds. As a result, the outputting of stored information signals can only occur in the interval of an integer multiple of T. This means that, when the information stored in the CCD image sensor cannot be outputted in one time period T, thereby necessitating further delay in the subscan time period, the subscan time period must be an integer times T, such as one T, 2T, 3T, etc., which is not a continuous value. When applied to a CCD image sensor in facsimile equipment, time is lost in outputting stored information from the CCD image sensor because of the fixed time period T in the subscan. As a result of this lack of control over the outputting of information during subscanning, the overall speed of the facsimile equipment is lessened.

SUMMARY OF THE INVENTION

It is an object of this invention to provide a method and apparatus for driving a CCD image sensor in which the time period of subscan can be a continuous value. In this regard, it is an object of this invention to more precisely control the operation of a CCD image sensor so that the subscan time period can be reduced and the speed of facsimile equipment using this method and apparatus can be increased.

In this invention, control time periods for the CCD image sensor are separated into first control time periods which are fixed and second control time periods which are variable. The first and second time periods appear alternately. Information signals are obtained by exposure of the CCD image sensor during the first control time periods. These information signals are transferred or outputted from the CCD image sensor during the second control time periods. The length of the second control time periods varies in response to the amount of information stored in the line memory device so that the length of the subscan time period, which is formed by the first and second control time periods, can be optimized.

BRIEF DESCRIPTION OF THE DRAWINGS

FIG. 1 shows a timing chart for a conventional method of controlling the operation of a CCD image sensor.

FIG. 2 shows a timing chart for the method of controlling the operation of a CCD image sensor according to the present invention.

DESCRIPTION OF THE PREFERRED EMBODIMENT

FIG. 2 shows a timing chart for explaining the method of driving a CCD sensor according to the present invention. In FIG. 2 $T_1$, $T_3$, ... $T_{2n-1}$ are first control time periods and $T_2$, $T_4$, ... $T_{2n}$ are second control time periods. First control time periods $T_1$, $T_3$, ... $T_{2n-1}$ have time periods which are determined by the characteristics of the CCD image sensor. Upon exposure of the CCD image sensor, charges are stored by the CCD image sensor during these time periods without saturation of the CCD image sensor. Second control time periods $T_2$, $T_4$, ... $T_{2n}$ are variable length time periods which are longer than the time it takes to output the charges stored in the CCD image sensor. As shown in FIG. 2, first control time periods $T_1$, $T_3$, ... $T_{2n-1}$ and second control time periods $T_2$, $T_4$, ... $T_{2n}$ appear alternately.

As shown in FIG. 2(c), a series of shift pulses SP are supplied to the CCD image sensor after each of the time periods $T_1$, $T_2$, ... $T_{2n}$. Upon occurrence of the first shift pulse $SP_1$, time period $T_1$ begins. Upon expiration of time period $T_1$, shift pulse $SP_2$ is generated and supplied to the CCD image sensor, which also initiates time period $T_2$. Upon expiration of time period $T_2$, shift pulse $SP_3$ is generated, etc. Upon expiration of every fixed time period $T_{2i-1}$ and alternate variable time period $T_{2i}$, shift pulses $SP_i$ are supplied to the CCD image sensor.

Accordingly, signals $b'_1, b'_3, \ldots b'_{2n-1}$, which correspond to first control time periods $T_1, T_3, \ldots T_{2n-1}$, are initiated by shift pulses $SP_2, SP_4, \ldots SP_{2n}$, respectively. Signals $b'_2, b'_4, \ldots b'_{2n}$, which correspond to second control time periods $T_2, T_4, \ldots T_{2n}$, are initiated by shift pulses $SP_3, SP_5, \ldots SP_{2n+1}$, respectively. However, signals $b'_2, b'_4, \ldots b'_{2n}$, which are shown in dotted lines, are not used by the facsimile equipment of the present invention.

Due to the existence of variable second control time periods $T_2, T_4, \ldots T_{2n}$ among first control time periods $T_1, T_3, \ldots T_{2n-1}$, it is possible to reduce the subscan time period formed by the first and second control time periods by making the subscan time period correspond to $(T_1+T_0)$, where $T_0$ equals the transfer output time period required to output the information stored in the CCD sensor during the previous exposure or first control time period. Thus, the maximum subscan speed is a function of the sum of the first control time period and time $T_0$.

Figure 3:
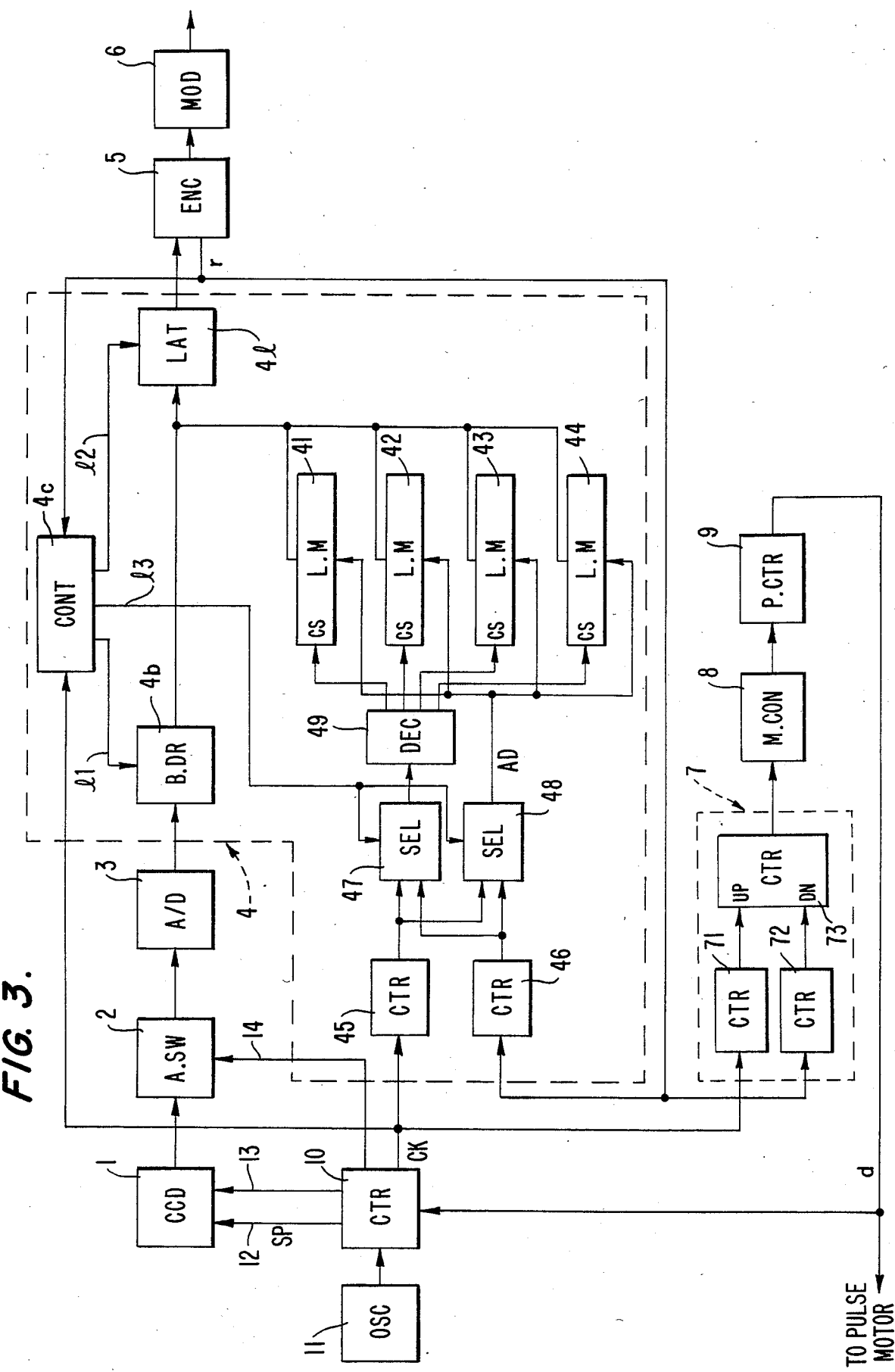
FIG. 3 is a block diagram of the main parts of facsimile equipment according to a first embodiment of the present invention.

An embodiment of facsimile equipment using the above method is shown in FIG. 3. An output signal of CCD image sensor 1 is supplied via analog switch 2 to A/D converter 3 for conversion to digital form. A digital output signal of converter 3 is temporarily stored in line memory device 4 and then supplied to encoder 5 to be encoded and compressed. An encoded signal from encoder 5 is modulated by modem 6 and then trasmitted to its ultimate distination.

The current storage condition of line memory device 4 is constantly detected by detecting circuit 7. Detecting circuit 7 counts down the number of line signals supplied from A/D converter 3 to line memory device 4 in counter 71 and the number of line signals read out from line memory device 4 by encoder 5 in counter 72. The difference between these counts is determined by up/down counter 73 and supplied to main controller 8.

Main controller 8 comprises a micropressor and memory which stores the program and data used by the microprocessor; the micropressor controls the operation of the whole facsimile equipment. In particular, main controller 8 receives difference signals from detecting circuit 7 which indicate the storing state of line memory device 4 and then this controller generates control signals which control the time periods between the pulses generated by program counter 9 to thereby prevent line memory device 4 from being overflowed or underflowed. That is, when there is a possibilty that line memory device 4 will overflow, controller 8 generates a control signal which lengthens the time periods. When there is a possibility that line memory device 4 will underflow, controller 8 generates a control signal which shortens the time periods.

Program counter 9 supplies scanning step pulses d shown in FIG. 2(d) to counter 10 and a pulse motor (not shown) at desired times based on the control signals from main controller 8. Counter 10 counts scanning step pulses d in response to reference clock signals by oscillator 11. At first, when scanning step pulse $d_1$ is supplied from counter 9 to counter 10, counter 10 puts out pulse $SP_1$ (FIG. 2(c)) through line 12 to CCD image sensor 1 so that the signals stored in the photosensor cells of the CCD image sensor are transferred to a shift register and then exposure of the photosensor cells begins. At the same time, counter 10 puts out a control signal over line 14 to turn off switch 2.

Counter 10 also generates clock signals by dividing the frequency of the reference clock signals from oscillator 11. These clock signals are supplied to image sensor 1 over line 13 during the time $T_0$ (FIG. 2(b)) so that the signals stored in the shift register of CCD image sensor 1 are outputted to switch 2. The number of clock signals generated by counter 10 corresponds to the number of elements in the shift register. However, since switch 2 is turned off at this stage, the signals outputted from CCD image sensor 1 are not supplied to A/D converter 3. But when counter 10 counts up the number of reference pulses corresponding to predetermined time period $T_1$ (FIG. 2(a)) from the time of pulse $SP_1$, counter 10 generates pulse $SP_2$, which is supplied to image sensor 1 over line 12 so that the signals stored in the photosensor cells are transferred to the shift register and exposure of the photosensor cells begins. At the same time, counter 10 outputs a control signal over line 14 to turn on switch 2. Counter 10 further outputs the clock signals generated by dividing the frequency of the reference clock signals over line 13 to image sensor 1 during time $T_0$ so that the signals stored in the shift register are supplied to A/D converter 3 through switch 2. The number of clock signals corresponds to the number of elements in the shift register.

After outputting the clock signals, counter 10 does not generate any additional signals until the next scanning step pulse $d_2$. When pulse $d_2$ is supplied from counter 9, counter 10 outputs pulse $SP_3$ over line 12 and generates a control signal to turn off switch 2. Since these and the other steps described above are repeated, only the output picture signals $b'_1, b'_3, \ldots b'_{2n-1}$ (FIG. 2(b)) out of the output picture signals $b'_1, b'_2, b'_3, \ldots b'_{2n}$ are passed through switch 2. As a result, the subscanning time periods $T_1+T_2, T_3+T_4, \ldots T_{2n-1}+T_{2n}$ vary. Since $T_2, T_4, \ldots T_{2n}$ have values larger than or equal to $T_0$, the subscanning time periods have values larger than or equal to $T_1+T_0$. As a result, precise and optimum control of the amount of data temporarily stored in line memory device 4 can be achieved.

Next, the control of the scanning step pulses d in response to the storage condition of line memory device 4 will be explained in more detail. The digital signal from converter 3 is written in line memories 41–44 via bus driver 4b under the control of controller 4c. Each time encoder 5 outputs read request pulse r, data is read out from line memories 41–44 and supplied via latch 4l to encoder 5 under the control of controller 4c. The addresses for writing data into line memories 41–44 are provided by counter 45 by counting clock signal CK, which is synchronized with the clock signal on line 13 which outputs the signals stored in the shift register of CCD image sensor 1. The addresses for reading out data from line memories 41–44 are provided by counter 46 by counting the read request pulse r. The upper two bits of counter 45 select the line memory at the time of writing and the upper two bits of counter 46 select the line memory at the time of reading out. Other bits of counters 45 and 46 designate the memory address. When the counter in counters 45 and 46 corresponds to the number of elements of CCD image sensor 1, the upper two bits are varied, e.g., from "00" to "01", from "01" to "10", from "10" to "11", or from "11" to "00".

Selectors 47 and 48 are switched by controller 4c so that the output signals from counters 45 and 46 are passed through at the time of writing and reading out, respectively. Controller 4c controls bus driver 4b, latch 4l and selectors 47-48 through lines 11, 12 and 13 so that information is either read out or written in line memories 41-44 in response to clock signals CK from counter 10 or read request pulses r. Decoder 49 decodes the upper two bits of counter 45 or counter 46, and selects one of the line memories 41-44.

Figure 4:
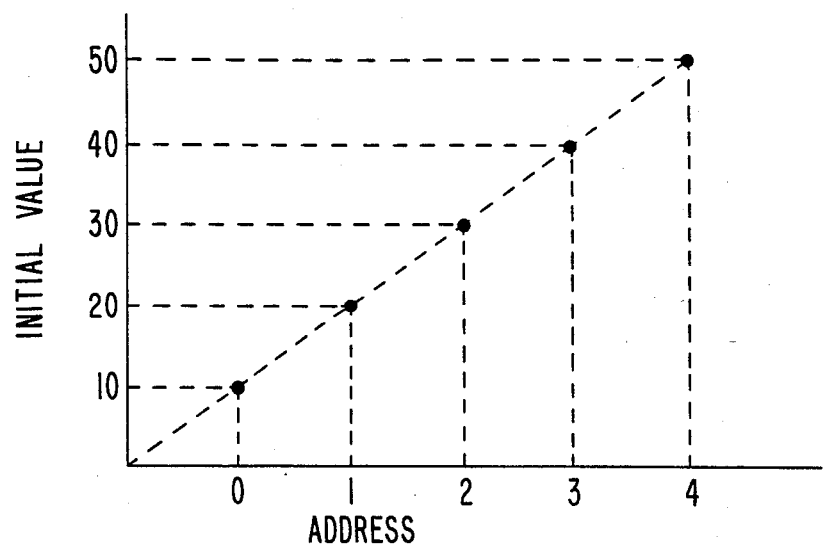
FIG. 4 is a diagram showing the relationship between the initial value of the program counter of FIG. 3 and the ROM address of the main controller.

Line counter 71 generates one pulse each time the number of clock signals CK corresponds to the picture signal for one scanning line. On the other hand, line counter 72 generates one pulse each time the number of read request signals corresponds to the picture signal for one scanning line. The output signals of line counter 71 are supplied to the up terminal of up-down counter 73 and the output signals of line counter 72 are supplied to the down terminal. When picture signals for one scanning line are written in line memories 41-44, up-down counter 73 counts up and when picture signals for one scanning line are read out, up-down counter 73 counts down. Accordingly, the count of counter 73 indicates the number of line memories in use. This count also designates addresses in the ROM of main controller 8 where the initial values of counter 9 corresponding to the number of line memories which are being used are stored. The relation between the initial values of counter 9 and these addresses is determined in advance as shown in FIG. 4, for example. Counter 9 down counts from the intial values in response to a clock signal and generates scanning step pulses d when the value becomes 0. Here the time of counting from 10 (initial value) to 0 is equal to the time $(T_1+T_0)$. Thus, the time periods between pulses d can be varied according to the number of line memories which are being.

Figure 5:
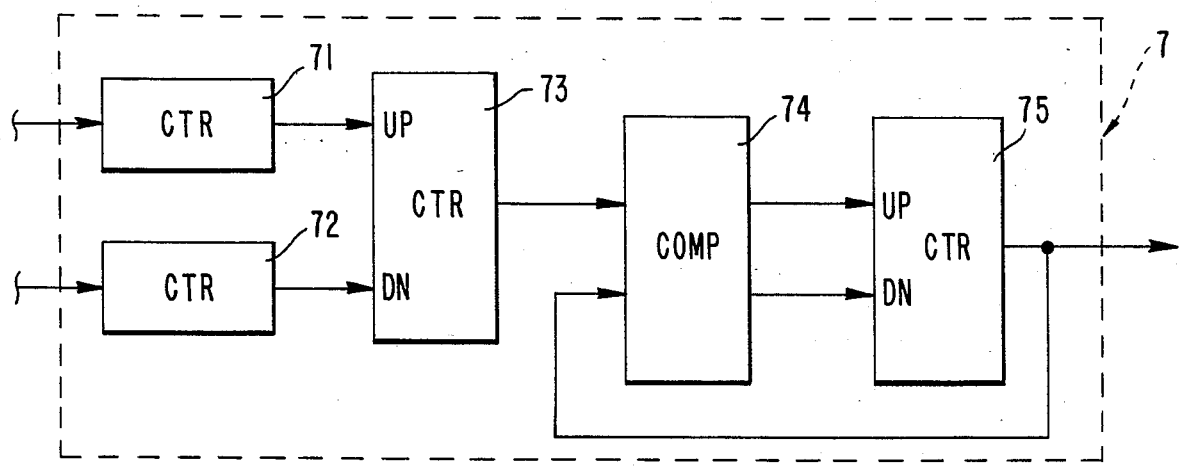
FIG. 5 is a block diagram of a modification of the detecting circuit shown in FIG. 3.

FIG. 5 shows a modification of detecting circuit 7 of FIG. 3. In this modified circuit, comparator 74 and another up-down counter 75 are connected to the output of up-down counter 73. Comparator 74 compares the output value of up-down counter 73 and the output value of up-down counter 75, and if the output value of counter 73 is larger than the output value of counter 75, comparator 74 actuates the up terminal of counter 75 so that counter 75 counts up by 1. If the output value of counter 73 is smaller than the output value of counter 75, comparator 74 actuates the down terminal of counter 75 so that counter counts down by 1. Comparator 74 performs the above comparison each time counter 9 outputs pulse d.

In the modified detecting circuit of FIG. 5, the output value from detecting circuit 7 to controller 8 does not change radically, i.e., the value designating an address of ROM cannot be changed by more than 1 for each pulse d. As a result, the initial value of counter 9 does not change radically and consequently the speed of the pulse motor is not subjected to rapid variations.

Although illustrative embodiments of the invention have been described in detail with reference to the accompanying drawings, it is to be understood that the invention is not limited to those precise embodiments and that various changes and modifications may be effected therein by one skilled in the art without departing from the scope or spirit of the invention.

I claim:

1. In facsimile type equipment having a CCD image sensor which is exposed to receive and temporarily store image information signals during a first control time period of fixed duration and then output these image information signals during a second control time period, the first and second control time periods alternating with each other as images are successively exposed to said CCD image sensor, a CCD image sensor driving apparatus comprising:
    memory means coupled to said CCD image sensor for receiving and temporarily storing only the image information signals generated by said CCD image sensor during successive first control time periods, said memory means disregarding any image information signals generated by said CCD image sensor during successive second control time periods;
    encoder means coupled to said memory means for successively encoding the image information signals read out from said memory means;
    detecting circuit means responsive to the storage condition of said memory means for generating a storage signal representative of the current amount of storage of image information signals in said memory means; and
    control circuit means coupled to said detecting circuit means and responsive to said storage signal for generating control signals which are coupled to said CCD image sensor to vary the length of each second control time period in accordance with the amount of storage of image information signals in said memory means, the second control time period being greater than or equal to the amount of time required to transfer the image information signals from said memory means to thereby optimize the time period of the second control time period and increase the speed of the facsimile type equipment.

2. A CCD image sensor driving apparatus according to claim 1 further comprising counter means coupled to said control circuit means for receiving the control signals and generating scanning step pulses which determine the length of the second control time periods.

3. A CCD image sensor driving apparatus according to claim 2 wherein said detecting circuit means includes an up-down counter which counts up or down in accordance with the image information signals incoming to said memory means.

4. A CCD image sensor driving apparatus according to claim 2 wherein said detecting circuit means includes a first up-down counter and a second up-down counter, said first counter counting up or down in accordance with the image information signals incoming to said memory means and said second counter counting up or down by one according to the result of comparing the output of said first counter and the output of said second counter to thereby prevent any rapid variation in the storage signal outputted by said detecting circuit means.

5. A method for driving a CCD image sensor in facsimile type equipment comprising the following steps:
    generating first control time periods for said CCD image sensor, the first control time periods having a fixed duration which said CCD image sensor is exposed to receive and temporarily store image information signals;
    generating second control time periods for said CCD image sensor, each second control time period hving a variable duration during which said CCD image sensor outputs the image information signals temporarily stored in said CCD image sensor during a transfer output time period, the second control time periods alternating with the first control time periods and each second control time period having a variable duration greater than or equal to the transfer output time period and which varies in accordance with the amount of image information temporarily stored in said CCD image sensor during the first control time periods.

6. A method for driving a CCD image sensor according to claim 5 further comprising the steps of:
   temporarily storing the image information signals outputted by said CCD image sensor in a memory device;
   generating storage signals representative of the amount of image information currently stored in said memory device; and
   varying the duration of the second control time periods of said CCD image sensor in response to the storage signals.

* * * * *